US007757155B2

(12) United States Patent
Lim et al.

(10) Patent No.: US 7,757,155 B2
(45) Date of Patent: Jul. 13, 2010

(54) SIGNAL TRANSMITTING AND RECEIVING DEVICE AND METHOD OF MOBILE COMMUNICATION SYSTEM

(75) Inventors: Kwang-Jae Lim, Daejeon (KR); Hyoung-Soo Lim, Daejeon (KR); Choomg-Il Yeh, Daejeon (KR); Yu-Ro Lee, Daejeon (KR); Jong-Ee Oh, Daejeon (KR); Dong-Seung Kwon, Daejeon (KR)

(73) Assignees: Samsung Electronics Co., Ltd. (KR); Electronics and Telecommunications Research Institute (KR); KT Corporation (KR); SK Telecom Co., Ltd. (KR); KTFreetel Co., Ltd. (KR); Hanaro Telecom., Inc. (KR)

( * ) Notice: Subject to any disclaimer, the term of this patent is extended or adjusted under 35 U.S.C. 154(b) by 281 days.

(21) Appl. No.: 11/660,152

(22) PCT Filed: Nov. 10, 2004

(86) PCT No.: PCT/KR2004/002902

§ 371 (c)(1),
(2), (4) Date: Aug. 24, 2000

(87) PCT Pub. No.: WO2006/011699

PCT Pub. Date: Feb. 2, 2006

(65) Prior Publication Data
US 2007/0296616 A1 Dec. 27, 2007

(30) Foreign Application Priority Data
Jul. 26, 2004 (KR) .................... 10-2004-0058274

(51) Int. Cl.
*H03M 13/00* (2006.01)
(52) U.S. Cl. ...................................... 714/780; 714/756

(58) Field of Classification Search ................. 370/238; 375/262, 267; 714/774, 776, 746, 780, 756
See application file for complete search history.

(56) References Cited

U.S. PATENT DOCUMENTS
5,289,501 A    2/1994    Seshadri et al.

(Continued)

FOREIGN PATENT DOCUMENTS
EP    1 189 380    3/2002

(Continued)

OTHER PUBLICATIONS

Ewangjae Lim et al,: CQI Signalling with Unequal Error Protection for DFDMA, IEEE 802.16 Broadband Wireless Access Working Group, May 2004.

*Primary Examiner*—David Ton
(74) *Attorney, Agent, or Firm*—The Farrell Law Firm, LLP (57) ABSTRACT

Disclosed is a signal transmission method in a mobile communication system. Unequal error protection (UEP) ratios are determined so that the bits may have different received qualities according to the weights of the bits. The bits are repeated by a bit sequence repeater (210) according to the determined UEP ratios to generate a repeated bit sequence having a predetermined number of bits. The generated repeated bit, sequence is interleaved by an interleaver (220) and the interleaved bit sequence is symbol-mapped by a symbol-mapper (230) to generate a transmission symbol sequence, and the generated transmission symbol sequence is transmitted by the transmitter to a receiver. Furthermore, also a corresponding signal reception method, a corresponding signal transmitter and a corresponding signal receiver are disclosed.

23 Claims, 6 Drawing Sheets

U.S. PATENT DOCUMENTS

| | | |
|---|---|---|
| 5,544,328 A | 8/1996 | Seshadri |
| 5,966,412 A | 10/1999 | Ramaswamy |
| 6,223,324 B1 | 4/2001 | Sinha et al. |
| 6,347,122 B1 * | 2/2002 | Chen et al. .................. 375/262 |
| 6,405,338 B1 | 6/2002 | Sinha et al. |
| 6,460,153 B1 * | 10/2002 | Chou et al. ................. 714/746 |
| 2003/0171934 A1 | 9/2003 | Zhang et al. |
| 2004/0125765 A1 * | 7/2004 | Yun et al. ................... 370/328 |
| 2005/0195915 A1 * | 9/2005 | Raleigh et al. .............. 375/267 |

FOREIGN PATENT DOCUMENTS

WO    WO 03/019820    6/2003

* cited by examiner

[Fig. 1]

| Nos. | SINR ranges | CQI bits |
|---|---|---|
| 0 | SINR < -2dB | 0000 |
| 1 | -2dB < SINR < 0dB | 0001 |
| 2 | 0dB < SINR < 2dB | 0010 |
| 3 | 2dB < SINR < 4dB | 0011 |
| 4 | 4dB < SINR < 6dB | 0100 |
| 5 | 6dB < SINR < 8dB | 0101 |
| 6 | 8dB < SINR < 10dB | 0110 |
| 7 | 10dB < SINR < 12dB | 0111 |
| 8 | 12dB < SINR < 14dB | 1000 |
| 9 | 14dB < SINR < 16dB | 1001 |
| 10 | 16dB < SINR < 18dB | 1010 |
| 11 | 18dB < SINR < 20dB | 1011 |
| 12 | 20dB < SINR < 22dB | 1100 |
| 13 | 22dB < SINR < 24dB | 1101 |
| 14 | 24dB < SINR <26dB | 1110 |
| 15 | 26dB < SINR | 1111 |

SIGNAL TRANSMITTING AND RECEIVING DEVICE AND METHOD OF MOBILE COMMUNICATION SYSTEM

TECHNICAL FIELD

The present invention relates to a signal transmitting and receiving device and method in a mobile communication system. More specifically, the present invention relates to a method for providing different receive qualities to messages in which each bit has a different weight, and transmitting and receiving the messages.

BACKGROUND ART

In order to increase data rates or frequency efficiency in a mobile communication system, it is essential to use an adaptive transmission scheme for selectively adapting an appropriate modulation and coding method (a transmission method) according to channel environments and received signal qualities. In the adaptive transmission scheme, a mobile station estimates a channel quality depending on the current channel status, and reports the estimate to a base station so that the base station may select a suitable adaptive method. In such adaptive transmission, the channel quality report is very important.

In general, the signal-to-interference-and-noise ratio (SINR) is used as the metric on the channel quality in the report. In detail, the report process includes a step for dividing a range of a predetermined SINR value into regular intervals, and a step for transmitting a binary channel quality indicator (CQI) which corresponds to an estimated SINR value.

It is defined in the IEEE 802.16d orthogonal frequency division multiplexing access (OFDMA) standard that the SINR range between −2 dB and 26 dB is divided into intervals of 2 dB, and a 4-bit CQI sequence represents a SNR value of 16 different values.

For example, when the SINR value measured at the mobile station is given to be 2.5 dB, the mobile station reports, to the base station, a CQI message of "0011" which corresponds to the range in which the 2.5 dB SNIR value belongs. When the base station detects the CQI message, some errors may be generated depending on the channel status. If the base station detects the CQI bit to be "1011" because of an error, it determines the SINR range to be from 18 dB to 20 dB rather than the SINR range of from 2 dB to 4 dB which is indicated by the correct CQI message, and then, it selects a transmission method suitable for the high SINR range, and transmits data to the mobile station. However, the mobile station fails to successfully receive the data from the base station because of low channel quality.

Therefore, a more powerful encoding and modulation method for CQI message transmission is required for reducing the errors on the CQI message. The IEEE 802.16d OFDMA standard transmits a 4-bit CQI message over 48 subcarriers by using a block coding method and an 8-ary orthogonal modulation method.

Figure 1:
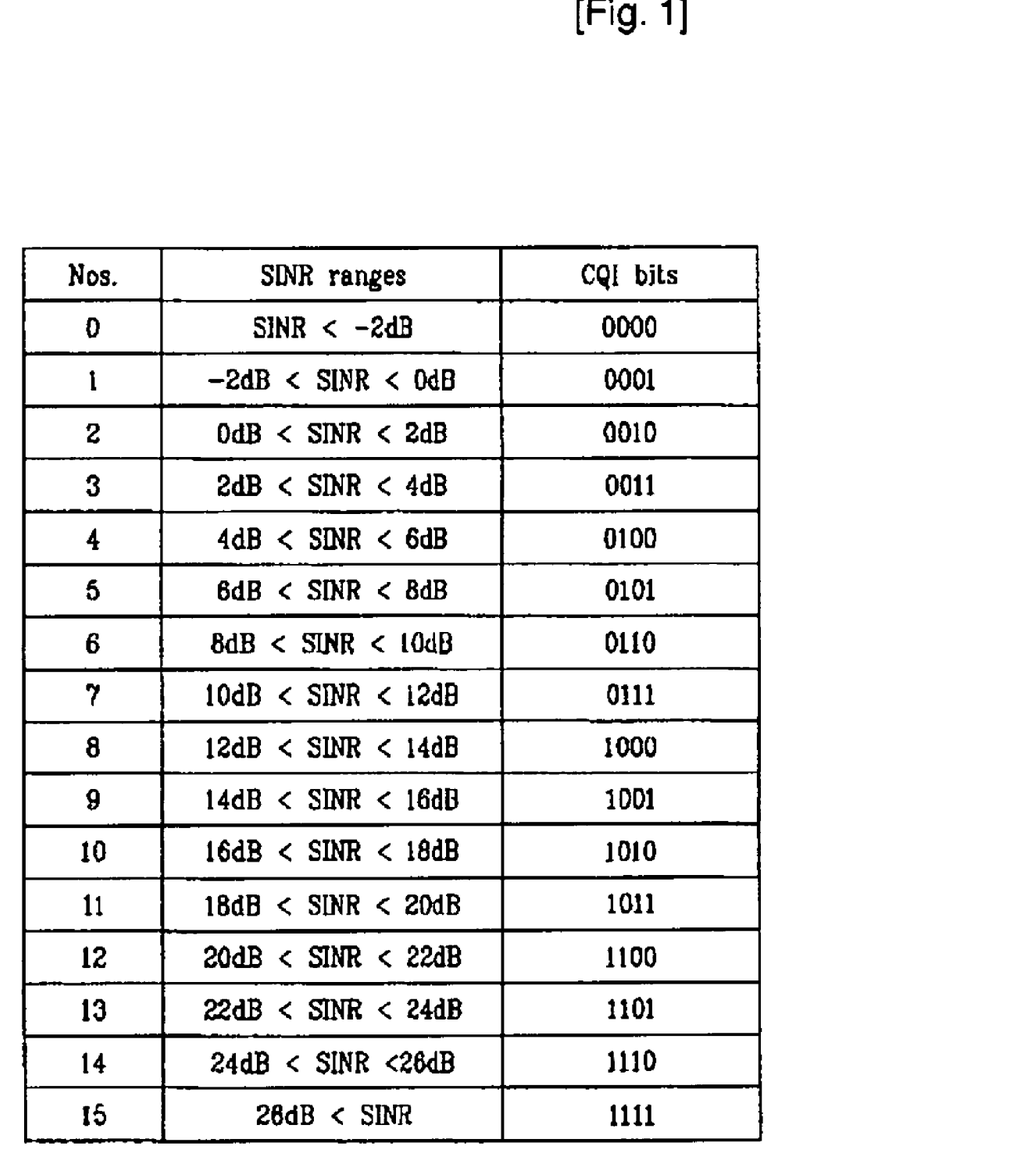
FIG. 1 shows CQI messages defined by the IEEE 802.16d OFDMA standard.

Referring to FIG. 1, bit error at different position in the CQI bit sequence causes different deviation from the actual SINR. For example, when a base station detect "0011" to be "0010" because of an error in the least significant bit (LSB), the SINR difference between a SINR value of 2 dB to 4 dB to be reported by the mobile station and a SNIR value of 0 dB to 2 dB detected at the base station is about 2 dB and this deviation is small. However, when the base station detect "0011" to be "1011" because of an error in the most significant bit (MSB), the difference between a SINR value of 2 dB to 4 dB to be reported by the mobile station and a SNIR value of 18 dB to 20 dB detected at the base station is 16 dB which is very large.

However, the block coding scheme in the conventional IEEE 802.16d OFDMA standard does not consider different weights on the bits, and hence, an error in the MSB causes a very serious error in SINR report. Also, strong blocking coding and orthogonal modulation increase complexity in realizing a transmitter and a receiver.

DISCLOSURE OF INVENTION

Technical Problem

It is an advantage of the present invention to provide a signal transmitting and receiving method in a mobile communication system having an unequal error protection (UEP) characteristic for transmitting a message so that the message may have different receiving qualities according to weights when the weights of each of bits configuring the message are different.

It is another advantage of the present invention to provide a signal transmitter and receiver of a mobile communication system having an unequal error protection (UEP) characteristic with less complexity.

Technical Solution

In one aspect of the present invention, in a method for transmitting a message including bits with different weights to a receiver in a mobile communication system, a method for transmitting a signal in a mobile communication system comprises (a) determining an unequal error protection (UEP) ratio which allows the bits to have different received qualities based on the weights of the bits; (b) repeating each bit by a repetition ratio corresponding to the determined UEP ratio, and generating a repeated bit sequence in a length of a pre-determined number of bits; (c) interleaving the repeated bit sequence; and (d) performing a symbol mapping process of the interleaved bit sequence to a symbol sequence, and generating a transmission symbol sequence in a length of a pre-determined number of symbols.

The UEP ratio is determined to be in a descending order of from a most significant bit (MSB) to a least significant bit (LSB).

The method further comprises (e) transmitting a predetermined number of symbol groups at a predetermined frequency and time, the symbol groups being grouped to have a predetermined number of symbols from the transmission symbol sequence.

The method further comprises, between (b) and (c), encoding the generated repeated bit sequence.

In another aspect of the present invention, in a method for receiving a symbol sequence from a signal transmitter of a mobile communication system, a method for receiving a signal of a mobile communication system comprises: (a) detecting a bit sequence from the symbol sequence, wherein the symbol sequence includes a pre-determined number of symbols which are generated by interleaving and symbol-mapping a repeated bit sequence which is generated by repeating each bit according to an unequal error protection (UEP) ratio which is determined so that a plurality of bits with different weights may have different received qualities according to the weights of the bits; (b) de-interleaving the detected bit sequence; (c) combining the de-interleaved bit sequence by as many as the number of repeated bits based on the UEP ratio; and (d) determining each bit from the combined bit sequence, and reconstructing a message including a plurality of bits.

The step of detecting a bit sequence in (a) comprises: detecting a corresponding symbol for each symbol group of the symbol sequence; and detecting a plurality of data bits from the symbol which is detected for each symbol group wherein the symbol group is divided into a predetermined number of transmission symbol groups including a predetermined number of symbols, and the transmission symbol groups are then transmitted by the signal transmitter.

The bits after the symbol detection are represented in integers of 0 and 1, and the bit combining step in (c) comprises combining the bits into 0 or 1 according to the number of 0's or 1's in the corresponding bit.

The bits before the bit decision are represented in real numbers other than the integers of 0 and 1 in (d), and the bit combining step of (c) comprises summing values of corresponding bits.

In still another aspect of the present invention, in a transmitter for transmitting a message including a plurality of bits with different weights to a receiver in a mobile communication system, a signal transmitter of a mobile communication system comprises: a bit sequence repeater for determining an unequal error protection (UEP) ratio so that the bits may have different received qualities according to weights of the bits, repeating the bits by the corresponding UEP ratio based on the determined UEP ratio, and generating a bit sequence including a predetermined number of bits; an interleaver for interleaving the generated repeated bit sequence; and a symbol mapper for performing symbol mapping on the interleaved bit sequence to generated a transmission symbol sequence including a predetermined number of symbols, dividing the generated transmission symbol sequence into a predetermined number of transmission symbol groups including a predetermined number of symbols, and transmitting the transmission symbol groups to the receiver at a predetermined frequency and a time.

The signal transmitter further comprises an encoder for encoding the repeated bit sequence generated by the bit sequence repeater, and outputting encoded data to the interleaver.

In still yet another aspect of the present invention, in a receiver for receiving a symbol sequence from a signal transmitter in a mobile communication system, a signal receiver in a mobile communication system comprises: a symbol detector for detecting a bit sequence from the symbol sequence wherein the symbol sequence includes a predetermined number of symbols which are generated by interleaving and symbol-mapping a repeated bit sequence which is generated by repeating each bit according to an unequal error protection (UEP) ratio which is determined so that a plurality of bits with different weights may have different received qualities according to the weights of the bits; a de-interleaver for de-interleaving the detected bit sequence; a combiner for combining the bits having the same number as the UEP ratio in the de-interleaved bit sequence, and generating a bit sequence including a predetermined number of bits; and a bit decoder for determining each bit from the combined bit sequence, and reconstructing a message including a plurality of bits.

BRIEF DESCRIPTION OF THE DRAWINGS

The accompanying drawings, which are incorporated in and constitute a part of the specification, illustrate an embodiment of the invention, and, together with the description, serve to explain the principles of the invention.

BEST MODE FOR CARRYING OUT THE INVENTION

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

A signal transmitting method and device and a receiving method and device in a mobile communication system having an unequal error protection characteristic according to an exemplary embodiment of the present invention will be described with reference to drawings. A case in which a mobile station transmits a CQI message to a base station for the purpose of adaptive transmission in a downlink in an OFDMA-based mobile communication system will be exemplarily described.

Figure 2:
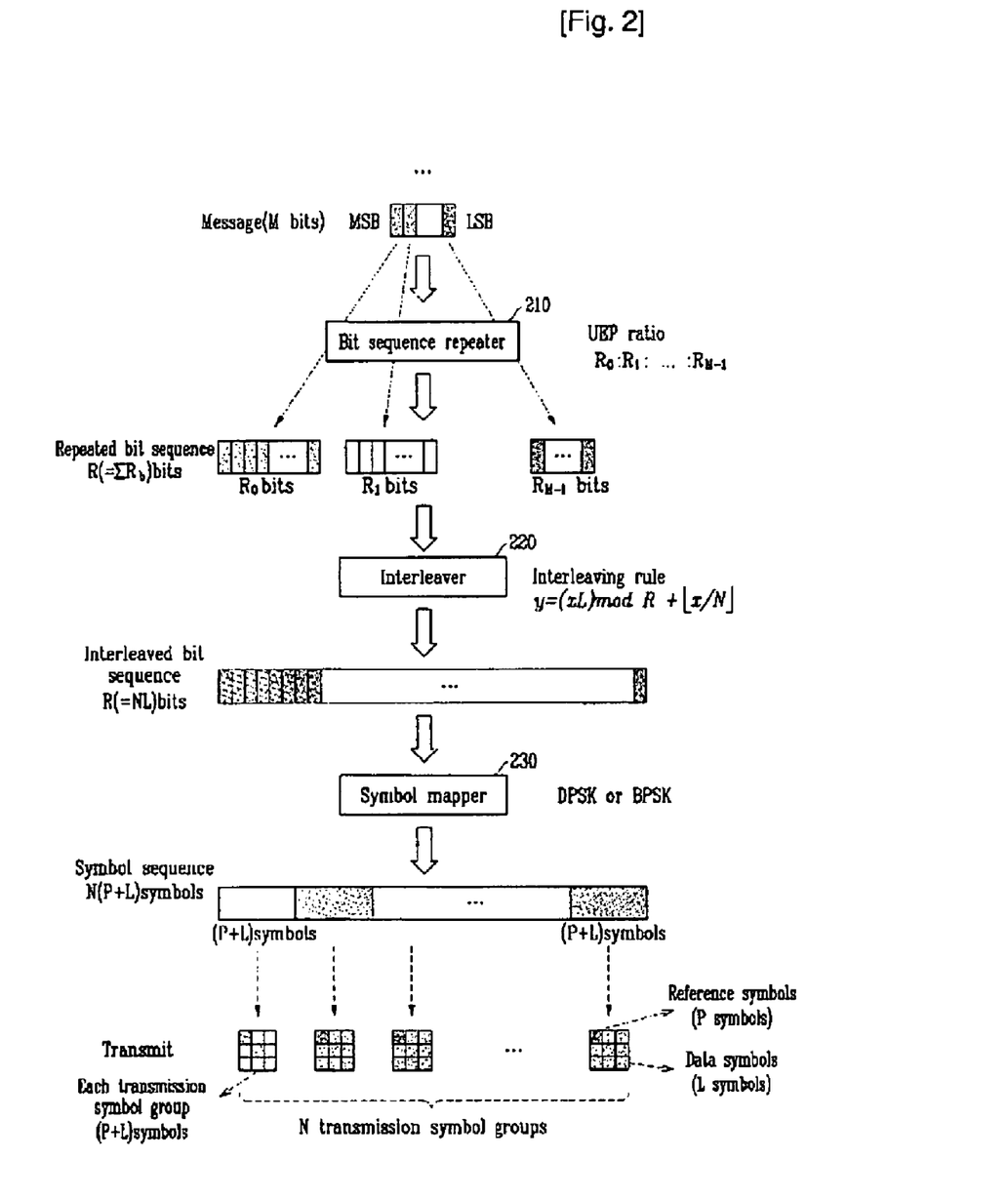
FIG. 2 shows a signal transmitter having an unequal error protection characteristic and an operation process thereof according to a first exemplary embodiment of the present invention.
Figure 3:
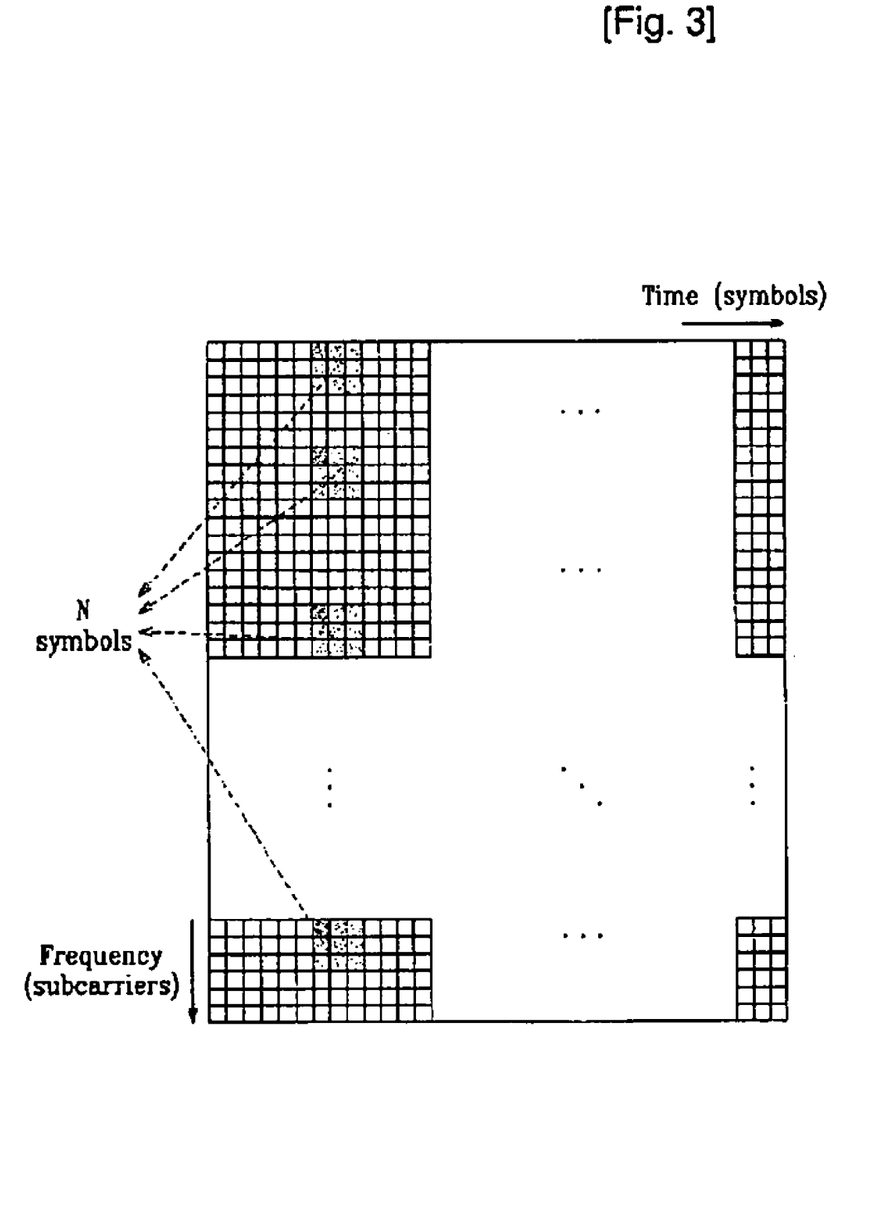
FIG. 3 shows transmission of N transmission symbol groups mapped by a symbol mapper shown in FIG. 2.

Referring to FIGS. 2 and 3, a signal transmitting device and method of a mobile communication system having an unequal error protection characteristic according to a first exemplary embodiment of the present invention will be described.

FIG. 2 shows a signal transmitter having an unequal error protection characteristic and an operation process thereof according to the first exemplary embodiment of the present invention.

As shown, the signal transmitter includes a bit sequence repeater 210, an interleaver 220, and a symbol mapper 230.

The bit sequence repeater 210 establishes unequal error protection (UEP) ratios $R_0:R_1: \ldots R_{M-1}$ for respective bits, and repeats the bits by the bits of $R_0, R_1, \ldots, R_{M-1}$ from the MSB to the LSB according to the UEP ratios to generate an R-bit repeated bit sequence, where the repetition number is a positive integer.

The UEP ratio satisfies Math Figure 1 in order to allocate more bit energy to the MSB, and the sum of the repeated ratios is given in Math Figure 2.

$$R_0 \geq R_1 \geq \ldots \geq R_{M-1} \qquad \text{Math Figure 1}$$

-continued $$R = \sum_{b=0}^{M-1} R_b \quad \text{Math Figure 2}$$

Various UEP ratios are realized by controlling the repetition number to satisfy Equations 1 and 2. For example, various UEP ratios are established such as $R_0:R_1:R_2:R_3=4:3:2:1$ or $R_0:R_1:R_2:R_3=3:3:2:2$ when the CQI message has four bits and R is given to be 10. By repeating the MSB in the largest number of times, the bits are completely reconstructed when the bit error is generated in the middle of the process, and thereby, the serious error caused by the bit error in the MSB is prevented.

The interleaver 220 rearranges the order of the repeated bit sequence generated by the bit sequence repeater 210 to thus perform interleaving. As shown in FIG. 2, when the transmission symbol sequence having a total of Nx(P+L) symbols generated by symbol mapping is divided into a predetermined number of groups in which the location of each symbol is expected to have a different channel characteristic in order to transmit a CQI message in a transmission frame, N transmission symbol groups are generated, and when each transmission symbol group has L data symbols and P reference symbols, an interleaving process is performed according to a bit index matching rule given in Math Figure 3.

$$y=(xL) \bmod R+\lfloor x/N \rfloor \quad \text{Math Figure 3}$$

where x is an index (x=0, . . . , R−1) showing locations of bits in the repeated bit sequence, y is an index (y=0, . . . , R−1) showing locations of bits in the interleaved bit sequence, L is a number (L=R/N) of data symbols transmitted from a transmission symbol group, R is a number of repeated bit sequences or interleaved bit sequences, and N is a number of transmission symbol groups.

The interleaving is performed in order to equally locate the bits repeated for the same bit to each group which has an independent channel characteristic and obtain the maximum diversity when the base station receives and combines the bits which are repeated for the same bit.

The symbol mapper 230 performs symbol mapping on the bit sequence interleaved by the interleaver 220 according to the differential phase shift keying (DPSK) which allows non-coherent demodulation or the binary phase shift keying (BPSK) which is a coherent demodulation method including pilot symbols, and thus generates a transmission symbol sequence including Nx(P+L) symbols. The transmission symbol sequence is divided into N transmission symbol groups each of which has (P+L) symbols, and the transmission symbol groups are transmitted at predetermined frequencies and times corresponding to the respective groups in the OFDMA transmission frame. As a result, the total of Nx(P+L) symbols are transmitted through the N transmission symbol groups.

As to symbol mapping, in the case of using the DPSK, a reference symbol is used as a reference phase for differential phase modulation on each MSB in each group, and the number P of the reference symbols for each group is given to be 1. In this instance, a reference symbol is additionally transmitted so as to L data symbols in each transmission symbol group. In the case of using the BPSK, the reference symbols function as a pilot symbol to thus enable channel estimation by the base station, and corresponding coherent demodulation. Further, P (at least one) reference pilot symbols are used for channel estimation and improvements of coherent demodulation performance. In this instance, P pilot symbols are additionally transmitted in order to transmit L data symbols in each transmission symbol group. The symbol mapping by the DPSK and the BPSK will not be further described since they are well known to a person skilled in the art. Each transmission symbol group in FIG. 2 is depicted to transmit a P (=1) reference symbol and L (=8) data symbols.

FIG. 3 shows transmission of N transmission symbol groups mapped by a symbol mapper shown in FIG. 2 at a predetermined frequency and time in the OFDMA frame.

As shown, the transmission symbol groups are transmitted at different frequencies and hence are affected by different channel responses in a frequency selective fading channel. The different channel responses are reflected as diversity gain when the base station demodulates the CQI message.

The signal transmitter having unequal error protection interleaved the repeated bit sequence generated by the bit sequence repeater 210 in the first exemplary embodiment of the present invention, and a modified case thereof will be described with reference to FIG. 4.

Figure 4:
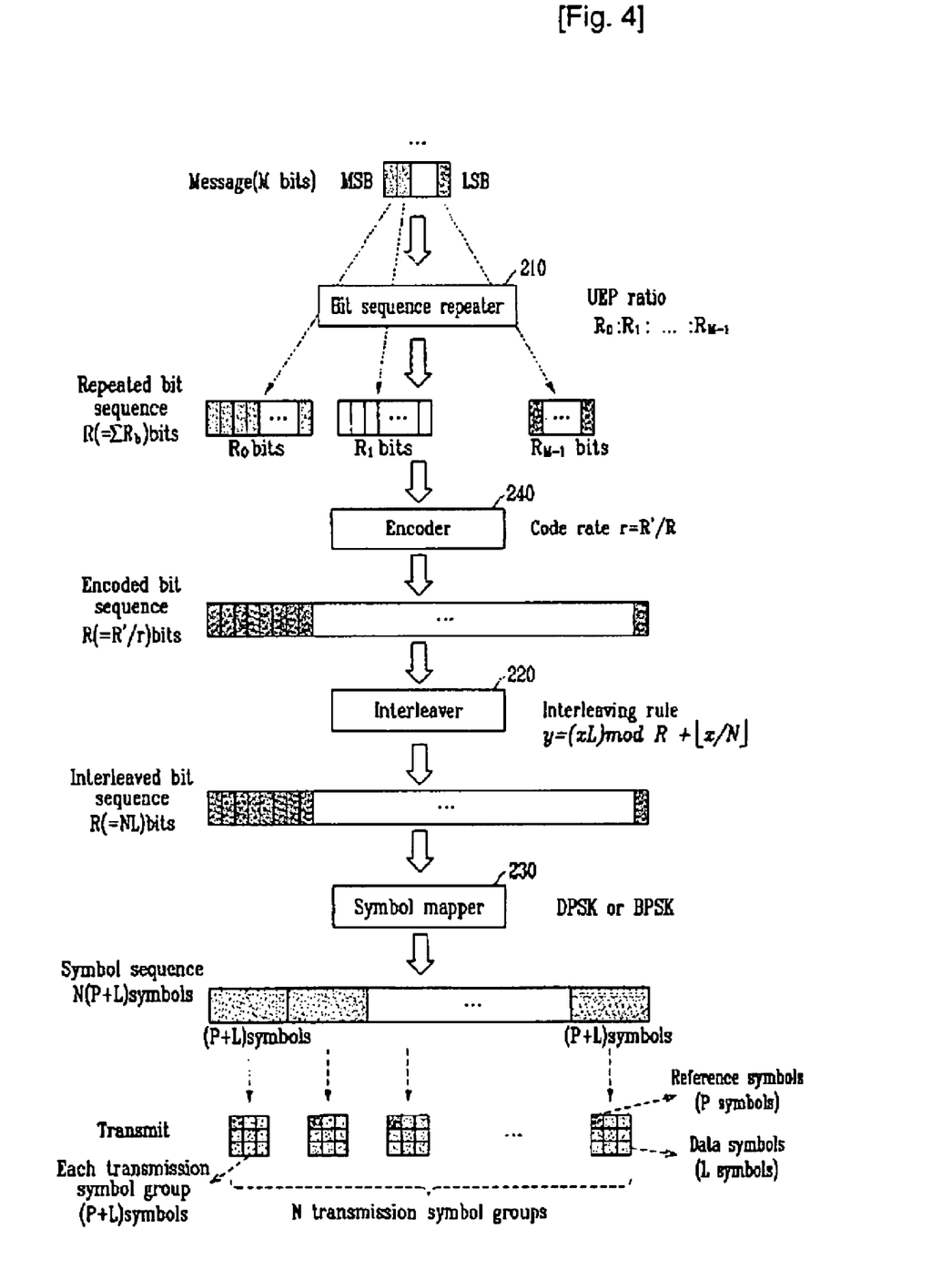
FIG. 4 shows a signal transmitter having an unequal error protection characteristic and an operation process thereof according to a second exemplary embodiment of the present invention.

FIG. 4 shows a signal transmitter having an unequal error protection characteristic and an operation process thereof according to a second exemplary embodiment of the present invention.

As shown, the signal transmitter includes a bit sequence repeater 210, an encoder 240, an interleaver 220, and a symbol mapper 230. That is, the signal transmitter according to the second exemplary embodiment further includes the encoder 240 in addition to the signal transmitter according to the first exemplary embodiment.

The encoder 240 encodes the repeated bit sequence generated by the bit sequence repeater 210 by using one of block coding, convolution coding, and turbo coding.

A length of the repeated bit sequence generated by the bit sequence repeater 210 is given in Math Figure 4, and a code rate r is given as r=R'/R. In this instance, the length of the bit sequence after encoding is given to be R, and no subsequent operation will be described since it corresponds to the operation according to the first embodiment.

$$R' = \sum_{b=0}^{M-1} R_b \quad \text{Math Figure 4}$$

In general, the bit energy allocated to the corresponding bit is to be increased in order to increase received quality of a predetermined bit, and the simplest method for including the bit energy for the predetermined bit is to repeatedly transmit the corresponding bit.

Therefore, the signal transmitter of the mobile communication system having the unequal error protection characteristic according to the first and second embodiments defines the UEP ratio according to weights of the bits, and repeatedly transmits the corresponding bits according to the weights of the corresponding bits. Also, the signal transmitter interleaves the bits repeated for processing the fading of the mobile communication system so that the bits may be transmitted with frequencies and times having different channel responses. Further, the signal transmitter uses the DPSK method to map the repeated bits and the interleaved bits to the DPSK symbols, and transmits them for the purpose of non-coherent demodulation.

Figure 5:
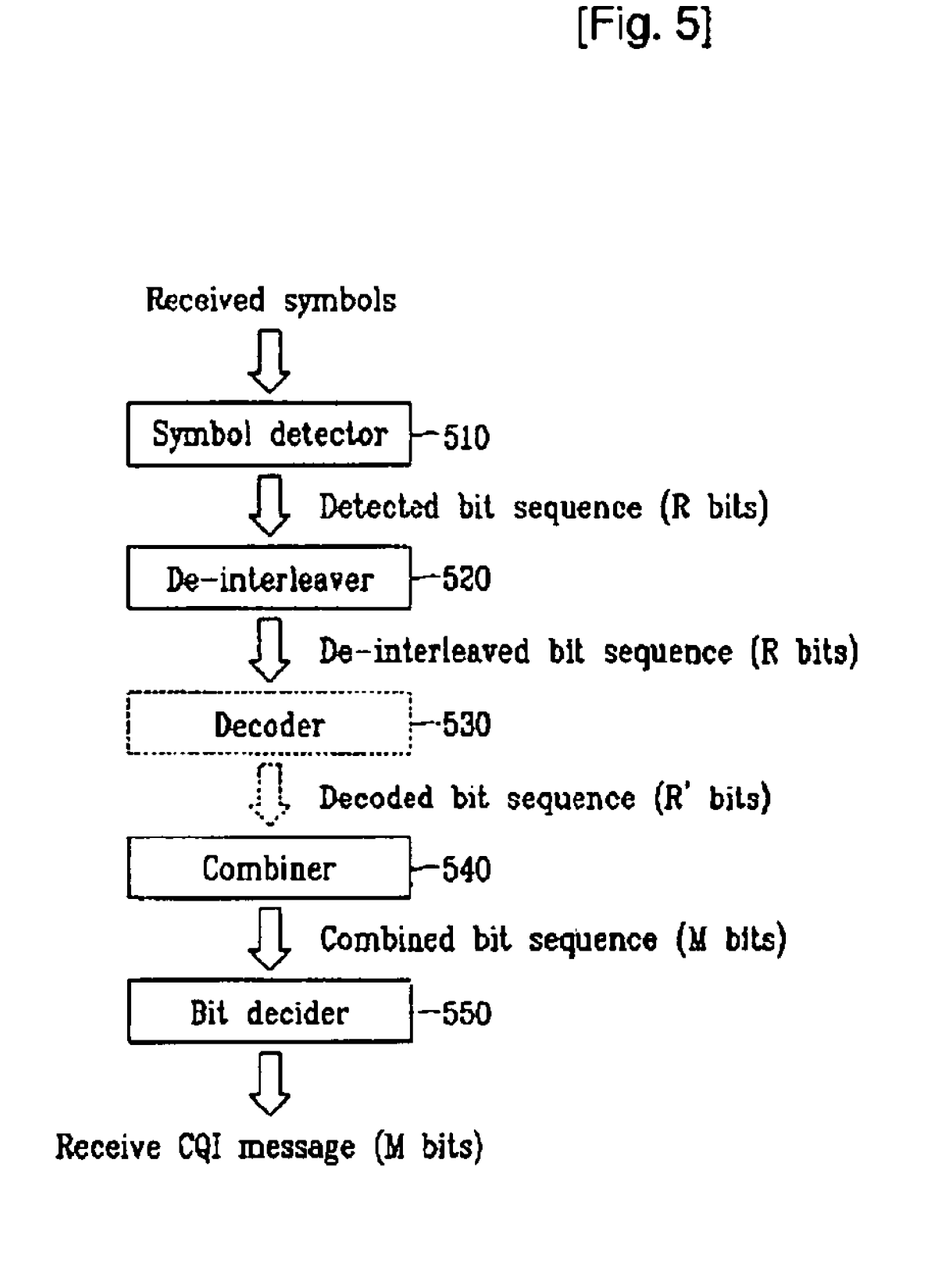
FIG. 5 shows a signal receiver having an unequal error protection characteristic and an operation process thereof according to an exemplary embodiment of the present invention.
Figure 6:
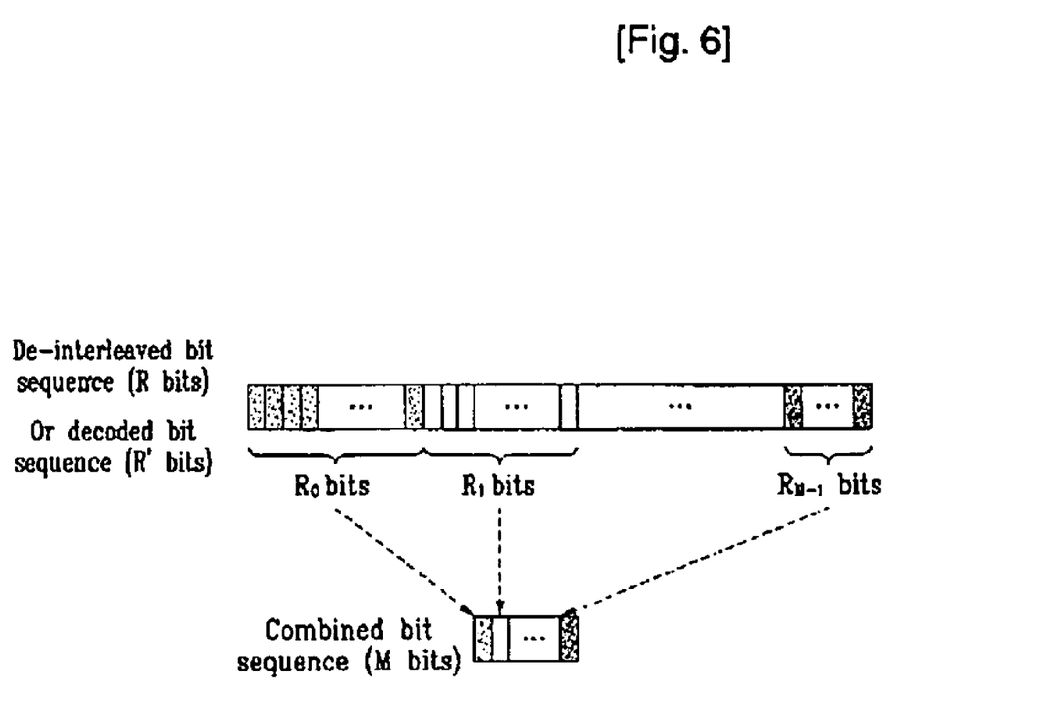
FIG. 6 shows a bit combining process by a combiner shown in FIG. 5.

Referring to FIGS. 5 and 6, a signal receiver and a receiving method of a mobile communication system having an unequal error protection characteristic for receiving a symbol sequence from the signal transmitter of the mobile communication system having an unequal error protection characteristic will be described.

FIG. 5 shows a signal receiver having an unequal error protection characteristic and an operation process thereof according to an exemplary embodiment of the present invention, and FIG. 6 shows a bit combining process by a combiner shown in FIG. 5. FIG. 5 shows that a base station receives a CQI message from a signal transmitter (a mobile station) having an unequal error protection characteristic according to the first and second embodiments, showing a reverse process of FIGS. 2 and 4.

As shown in FIG. 5, the signal receiver includes a symbol detector 510, a de-interleaver 520, a combiner 540, and a bit decider 550, and may further include a decoder 530 when performing an encoding process.

The symbol detector 510 detects, for each received symbol group, the corresponding Nx(P+L) received symbols of the symbol sequence received from the transmission frame, and detects L data bits for each group. In this instance, N symbol groups are transmitted from the transmission frame, and each symbol groups has (P+L) symbols where P is a number of reference symbols and L is a number of data symbols. Therefore, the symbol detector 510 detects R (=NL) data bits since N symbols groups and L data bits of each symbol group are provided. In this instance, the detected bits soft output values which are not the integers such as 0 or 1 but are real numbers for better receiving performance in the subsequent receiving processes.

The de-interleaver 520 performs de-interleaving according to a bit sequence index equation given as Equation 3. In the case of de-interleaving, y is a bit index of the detected R (=NL) data bit sequences, and x is a bit index of the R (=NL) data bit sequences which have underline de-interleaving, in Equation 3.

The decoder 530 performs decoding and generates a bit sequence with R' bits when the signal transmitter performs encoding as shown in FIG. 5. When the signal transmitter shown in FIG. 2 performs no encoding, the decoder 530 does not decode the de-interleaved bit sequence but inputs the same to the combiner 540.

As shown in FIG. 6, the combiner 540 combines the bits which correspond to the number of repetition $R_0:R_1:\ldots:R_{M-1}$ corresponding to each bit of the CQI message having M bits, and generates M received CQI bits, which represents an reverse process of the bit repeating process by the bit sequence repeater 210 shown in FIGS. 2 and 4. In this instance, the de-interleaved bits have soft output values which are real numbers, and the combined bits are the sum of soft output values of corresponding repeated bits.

The bits after the symbol detection can be represented in integers such as 0 or 1, and in this instance, when the repeated bits have more 1's than 0's, the combiner 540 determines them to be 1 and combines them, and when the repeated bits have more 0's than 1's, the combiner 540 determines them to be 0 and combines them according to a decision of the majority.

The bit decider 550 converts the real soft output values of the bits in the bit sequence combined by the combiner 550 into integer bit values of 0 and 1, and generates a received CQI message having M values of 0 or 1, which is the final receiving process for the received symbols.

The respective processes of symbol detection, decoding, and bit decision based on the DPSK or BPSK will be omitted since they are known to a person skilled in the art.

As described above, the signal receiver of a mobile communication system having the unequal error protection characteristic receives the symbol sequence from the sign signal transmitter to perform a reverse process of signal transmission, and combines various symbols which represent the same bit and which are received through different channel responses to obtain diversity gains pins of fading.

The exemplary embodiments have been described based on the binary DPSK, and the BPSK can also be used for the coherent modulation including pilot symbols, and other modulation methods are applicable.

Further, it has been described in the embodiments that the mobile station transmits the CQI message to the base station for the purpose of adaptive transmission in the downlink in the OFDMA-based system, but the present invention is applicable to any type of signal transmission methods for transmitting messages including bits with different weights, and is applicable to adaptive transmission in an uplink.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the present invention, errors caused by reports of channel quality are reduced by using the unequal error protection characteristic, and providing different received qualities according to weights of bits configuring a message.

The invention claimed is:

1. A method for transmitting a message including bits with different weights to a receiver in a mobile communication system, the method comprising:
   (a) determining an unequal error protection (UEP) ratio which allows the bits to have different received qualities according to the weights of the bits;
   (b) repeating each bit by a repetition ratio corresponding to the determined UEP ratio, and generating a repeated bit sequence in a length of a predetermined number of bits;
   (c) interleaving the repeated bit sequence; and
   (d) performing a symbol mapping process of the interleaved bit sequence to a symbol sequence, and generating a transmission symbol sequence in a length of a predetermined number of symbols.

2. The method according to claim 1, wherein the UEP ratio is determined to be in a descending order of from a most significant bit (MSB) to a least significant bit (LSB).

3. The method according to claim 1, further comprising:
   (e) transmitting a predetermined number of symbol groups at a predetermined frequency and time, the symbol groups being grouped to have a predetermined number of symbols from the transmission symbol sequence.

4. The method according to claim 1, wherein the interleaving in (b) is performed by the equation of $$y=(xL) \bmod R+\lfloor x/N \rfloor$$

where x is an index (x=0, ..., R−1) showing locations of bits in the repeated bit sequence, y is an index (y=0, ..., R−1) showing locations of bits in the interleaved bit sequence, L is a number (L=R/N) of data symbols transmitted from a transmission symbol group, R (=NL) is a number of repeated bit sequences or interleaved bit sequences, and N is a number of transmission symbol groups.

5. The method according to claim 3, wherein (e) comprises:
   dividing the transmission symbol sequence into a predetermined number of transmission symbol groups including a predetermined number of symbols; and
   transmitting corresponding symbols in the transmission symbol group in different frequency channels.

6. The method according to claim 3, wherein the symbol mapping uses the differential phase shift keying (DPSK) method, and the transmission symbol group includes a reference symbol and a plurality of data symbols.

7. The method according to claim 3, wherein the symbol mapping uses the binary phase shift keying (BPSK) method, and
the transmission symbol group includes a plurality of pilot symbols and a plurality of data symbols.

8. The method according to claim 7, further comprising, between (b) and (c), encoding the generated repeated bit sequence.

9. The method according to claim 8, wherein the message is a channel quality indicator (CQI) message for adaptive transmission depending on a channel status and a received signal quality.

10. The method according to claim 9, wherein the CQI message divides a range of a signal-to-interference-and-noise (SINR) value at predetermined intervals, and includes binary bits corresponding to the SINR value.

11. A method for receiving a symbol sequence from a signal transmitter of a mobile communication system, the method comprising:
(a) detecting a bit sequence from the symbol sequence wherein the symbol sequence includes a predetermined number of symbols which are generated by interleaving and symbol-mapping a repeated bit sequence which is generated by repeating each bit according to an unequal error protection (UEP) ratio which is determined so that a plurality of bits with different weights may have different received qualities according to the weights of the bits;
(b) de-interleaving the detected bit sequence;
(c) combining the de-interleaved bit sequence by as many as the number of repeated bits based on the UEP ratio; and
(d) determining each bit from the combined bit sequence, and reconstructing a message including a plurality of bits.

12. The method according to claim 11, wherein (a) comprises:
detecting a corresponding symbol for each symbol group of the symbol sequence; and
detecting a plurality of data bits from the symbol which is detected for each symbol group wherein the symbol group is divided into a predetermined number of transmission symbol groups including a predetermined number of symbols, and the transmission symbol groups are then transmitted by the signal transmitter.

13. The method according to claim 12, wherein the bits after the symbol detection are represented in integers of 0 and 1, and
(c) comprises combining the bits into 0 or 1 according to the number of 0's or 1's in the corresponding bit.

14. The method according to claim 12, wherein the bits before the bit decision are represented in real numbers rather than the integers of 0 and 1 in (d), and
(c) comprises summing values of corresponding bits.

15. The method according to claim 12, wherein the de-interleaving in (b) is performed by the equation of $$y=(xL) \bmod R + \lfloor x/N \rfloor$$

where x is an index (x=0, ..., R−1) showing locations of bits in the de-interleaved bit sequence, y is an index (y=0, ..., R−1) showing locations of bits in the detected received bit sequence, L is a number (L=R/N) of data symbols transmitted from a transmission symbol group, R (=NL) is a number of repeated bit sequences or interleaved bit sequences, and N is a number of transmission symbol groups.

16. The method according to claim 15, further comprising, between (b) and (c), decoding the de-interleaved bit sequence when the symbol sequence is encoded and received.

17. The method according to claim 16, wherein the message is a channel quality indicator (CQI) message for adaptive transmission.

18. A signal transmitter for transmitting a message including a plurality of bits with different weights to a receiver in a mobile communication system, the signal transmitter comprising:
a bit sequence repeater for determining an unequal error protection (UEP) ratio so that the bits may have different received qualities according to weights of the bits, repeating the bits by the corresponding UEP ratio based on the determined UEP ratio, and generating a bit sequence including a predetermined number of bits;
an interleaver for interleaving the generated repeated bit sequence; and
a symbol mapper for performing symbol mapping on the interleaved bit sequence to generated a transmission symbol sequence including a pre-determined number of symbols, dividing the generated transmission symbol sequence into a predetermined number of transmission symbol groups including a predetermined number of symbols, and transmitting the transmission symbol groups to the receiver at a predetermined frequency and time.

19. The signal transmitter according to claim 18, wherein the UEP ratio is determined such that the MSB may have the highest UEP ratio and the LSB may have the lowest UEP ratio, and
the sum of determined UEP ratios corresponds to the number of bits in the repeated bit sequence.

20. The signal transmitter according to claim 19, wherein the transmission symbol groups are transmitted at different frequency channels.

21. The signal transmitter according to claim 18, further comprising an encoder for encoding the repeated bit sequence generated by the bit sequence repeater, and outputting encoded data to the interleaver.

22. A signal receiver for receiving a symbol sequence from a signal transmitter in a mobile communication system, the signal receiver comprising:
a symbol detector for detecting a bit sequence from the symbol sequence wherein the symbol sequence includes a predetermined number of symbols which are generated by interleaving and symbol-mapping a repeated bit sequence which is generated by repeating each bit according to an unequal error protection (UEP) ratio which is determined so that a plurality of bits with different weights may have different received qualities according to the weights of the bits;
a de-interleaver for de-interleaving the detected bit sequence;
a combiner for combining the bits having the same number as the UEP ratio in the de-interleaved bit sequence, and generating a bit sequence including a pre-determined number of bits; and
a bit decider for determining each bit from the combined bit sequence, and re-constructing a message including a plurality of bits.

23. The signal receiver according to claim 22, further comprising a decoder for decoding the de-interleaved bit sequence, and outputting decoded data to the combiner.

* * * * *